United States Patent Office 3,558,543
Patented Jan. 26, 1971

---

3,558,543
POLYVINYL PYRROLIDONE PIGMENT "SHOCK" REDUCER
Gordon Totty, Lunenburg, Worcester, Mass., assignor to Borden, Inc., New York, N.Y., a corporation of New Jersey
No Drawing. Filed Nov. 9, 1966, Ser. No. 592,996
Int. Cl. B01f 3/10
U.S. Cl. 260—29.6                5 Claims This invention relates to methods for preparing paper coating materials and in particular methods for reducing initial thickening effect in preparing said coating material.

In order to obtain paper having characteristics of good printability, it is necessary that the surface of the paper be smooth, and substantially free of indentations or valleys. Smooth papers are a requisite for good image formation printed thereon and also for good transfer of ink to the paper. Prior methods of preparing smooth papers have included pressing the paper stock through calendering rolls under heat and pressure. However, this tends to crush the paper fibers and causing further undesirable features in the properties of the paper such as the loss of strength, brightness, opacity, and resiliency. Another method was to coat the paper with pigment slurries wherein the said pigment slurries fill in the valleys of the rough paper. These pigment slurries in addition to rendering the paper smooth, are designed to improve the whiteness of the paper, its printability, its pick strength, its water resistance, and its ink holdout. Further, a necessary characteristic of the coating material is that it is not ink repellant, i.e., possesses physical and/or chemical attraction to the printing ink.

The coating formulation material comprises at least two portions: These are the pigment portion, and the adhesive portion. The pigment portion is generally kaolin clay in an aqueous slurry. Other materials may be used separately or admixed therewith and include titanium dioxide, calcium carbonate, aluminum sulfate and calcium oxide reaction products. These are to impart a smooth white surface to the paper and to modify brightness and ink receptivity of the coated paper. Generally the pigment slurry is milled under high shear until a very fine dispersion of the solids in the aqueous phase is prepared. To the pigment portion is added an adhesive portion in order to improve the adhesive quality of the pigment to the paper. Generally the adhesives comprise starches and protein material, such as casein or soy and synthetic latexes. Also used with a high degree of success is polyvinyl alcohol. In preparing the coating formulation material the adhesive, in aqueous solution, is admixed with the pigment slurry which is thereafter coated onto paper. Admixing the adhesive solution with the pigment slurry may result in what is known in the industry as pigment shock in that there is a rapid increase in viscosity during the early stages of adhesive addition. This phenomenon of pigment shock may result in flocculation of the pigment, pigment agglomeration, difficulty in mixing, and in severe cases, complete coagulation. The severity of pigment shock is particularly pronounced when the adhesive is protein material or polyvinyl alcohol.

The present invention provides a method for admixing a coating formulation material wherein polyvinyl alcohol adhesive portion and pigment portion are combined in a manner which eliminates pigment shock generally associated therewith.

Briefly stated, the present invention comprises a method for admixing polyvinyl alcohol adhesive portion with conventional pigment portions wherein there is present, as a pigment shock reducing agent, a polymerized pyrrolidone material in said admixture. The invention also comprises the coating formulation material so prepared, and the coated paper.

As to materials, the pigment portion is generally an aqueous dispersion of coating grade clays such as kaolin clays. In conjunction with the clays there may be added therewith one or more of the following, titanium dioxide, calcium carbonate, barium sulfate, talo, zinc sulfate, aluminum sulfate and calcium oxide reaction products and other similarly used materials.

As to the adhesive portion, polyvinyl alcohol is widely used as the adhesive material and it is in this connection that this invention finds its utility. We have discovered that the pigment shock associated with addition of polyvinyl alcohol adhesive portion to the pigment portion is successfully reduced and substantially eliminated by including in said admixture a polymerized pyrrolidone material. The adhesive portion is generally a water solution of hydrolyzed polyvinyl alcohol. The alcohol used is at least 95% hydrolyzed and preferably, for best results, 99.5% hydrolyzed from the acetate as being the practical upper limit.

As to the pigment shock reducing agent we have found that water soluble polyvinyl pyrrolidone gives excellent results. Other water soluble vinyl pyrrolidone polymers which are useful include copolymers with vinyl pyrrolidones. In addition to the homopolymer of polyvinyl pyrrolidone, lower alkyl derivatives thereof may be used which include 3-methyl-N-vinyl-2-pyrrolidone, 4-methyl-N-vinyl-2-pyrrolidone, 3,3-dimethyl - N - vinyl-2-pyrrolidone, 4-ethyl-N-vinyl-2-pyrrolidone, 5-methyl-N-vinyl-2-pyrrolidone, 5-ethyl-N-vinyl-2-pyrrolidone, and the like.

Water soluble copolymers of the aforementioned compounds can also be used, including copolymers of vinyl pyrrolidone, in combination with for example, the following ethenoid bond monomers: allyl alcohol, diallyl phthalate, isobutyl vinyl ether, maleic anhydride, vinyl acetate, vinyl chloride, acrylic acid, crotonic acid, vinyl laurate, vinyl stearate, diethyl itaconate, and the like. Where a copolymer is used, and in order to maintain water solubility, the pyrrolidone portion of the polymer should be at least 20% by weight. The molecular weight of the agents vary between about 300 and 400,000 with suitable results being obtained across the range, however, the best results are obtained in the lower molecular weight range of the vinyl pyrrolidone polymer, as in the range of 300–50,000.

In preparing the coating material, an aqueous slurry of the pigment is prepared by admixing in a water system, the clay and other additives. pH is preferably in the alkaline range as between about 7.2–12 with best results being obtained when the range of 8.5–10 alkaline materials, such as sodium hydroxide, are added in proportion to achieve this pH range. The pigment slurry is generally prepared as a dispersion of solids in the range of about 40–75% by weight. The higher range being preferred as in the range 60–70% solids for reasons including economy of handling. The adhesive proportion is prepared by making a water solution of the hydrolyzed polyvinyl alcohol in the range of 3–15% by weight. The vinyl pyrrolidone polymer may be added to either the pigment slurry or the alcohol solution, however, it must be present in one or both of these portions prior to the admixture of the two portions. The vinyl pyrrolidone polymer is used in weight proportion of from .005–2% on the weight of pigment solids (clay and other pigments). Proportions outside of this range is considered either inoperative below the lower range and wasteful above the upper range.

In the examples that follow and elsewhere herein, proportions are expressed as parts by weight unless specifically stated to the contrary.

EXAMPLE I

A pigment portion aqueous slurry of 60% solids was prepared by blending in a dispersion of:

| Material: | Quantity, gms. |
|---|---|
| Water | 346 |
| Sodium Hexametaphosphate (10% solution) | 18 |
| Spray satin clay (kaolin clay) | 540 |
| $TiO_2$ | 60 |
| NaOH (10% soln.) | 12 |
| Polyvinyl Pyrrolidone (10% soln.) (mw. about 10,000) | [1] 6 |

[1] .1% on pigment solids.

An aqueous adhesive portion 7.5% solution of 99% hydrolyzed polyvinyl alcohol was prepared.

74 grams of the adhesive portion was blended into 500 grams of the pigment portion. Only a slight increase in viscosity was noted (slight shock).

In a modification of this example, the agent is omitted from the pigment portion and incorporated in the adhesive portion. Similar results are obtained.

EXAMPLE II

In a comparative example, which forms no part of this invention, the compositions of Example I were prepared, except that the polyvinyl pyrrolidone was totally omitted and the proportion of water in the pigment portion was increased accordingly. When the two portions were admixed, the resulting material sharply increased in viscosity (severe shock). In some cases, the resulting mixture flocculated and coagulated.

EXAMPLE III

The process of Example I is repeated except that higher molecular weight polyvinyl pyrrolidones were used. Resulting materials tend to increase in viscosity (shock) with increasing molecular weight although even at a molecular weight of 400,000 and greater. The shock is considerably less than with no polyvinyl pyrrolidone present.

In a modification of this example, the process of Example III is repeated except that the proportion of the agent is varied in the proportions described. Good results are obtained when at least .005% by weight of the pigment solids agent is used. No appreciable increase is noted when more than 2% is used.

EXAMPLE IV

The process of Example I is repeated except that the interpolymers of pyrrolidone are substituted for the polyvinyl pyrrolidone separately and in turn, and in the proportions disclosed. Results within the range of Examples I and III are obtained.

EXAMPLE V

The process of Example I is repeated except that the additives disclosed used in the pigment portion in place of the $TiO_2$ comparable results are obtained.

EXAMPLE VI

The products of the examples disclosed which form a part of this invention are used to coat paper by methods well known in the paper coating art, such as, knife, blade, doctor knife, and the like. The dry coated paper is then printed thereon with compatible ink. The paper is smooth, has suitable strength, good printability, good water resistance, and ink holdout properties.

It will be understood that it is intended to cover all changes and modifications of the examples of the invention herein chosen for the purpose of illustration which do not constitute departures from the spirit and scope of the invention.

I claim:

1. A method for producing pigment shock in pigmented paper coating composition when admixing and alkaline pH pigment portion comprising coating grade clays and a polyvinyl alcohol adhesive portion to form said pigmented paper coating, comprising, admixing said portions in the presence of a water soluble polymer comprising at least 20% by weight of the polymer selected from the group consisting of polyvinyl pyrrolidone, lower alkyl derivatives of polyvinyl pyrrolidone and copolymers of ethenoid bond monomers with vinyl pyrrolidone and said polymer being present in proportion of at least 0.005%–2% by weight of the pigment portion solids.

2. The process of claim 1, wherein said water soluble polymer is polyvinyl pyrrolidone and having a molecular weight in the range of 300–400,000.

3. The process of claim 2 wherein said pigment portion comprises kaolin clay.

4. The process of claim 3 wherein said pigment portion includes a material selected from the group consisting of titanium dioxide, calcium carbonate, barium sulfate, talc, zinc sulfate, and the reaction products of aluminum sulfate and calcium oxide.

5. The process of claim 2 wherein said polyvinyl alcohol is hydrolyzed in proportion of at least 95%.

References Cited

UNITED STATES PATENTS

| 3,028,351 | 4/1962 | Plitt | 260—29.6HW |
| 3,298,987 | 1/1967 | Colgan | 260—29.6WA |
| 3,359,225 | 12/1967 | Weisend | 260—29.6HW |

OTHER REFERENCES

Davidson and Sittig, Water Soluble Resins, Rheingold 1962, p 116 Retld on.

JULIUS FROME, Primary Examiner

LEON GARRETT, Assistant Examiner

U.S. Cl. X.R.

117—155, 161

PO-1050
(5/69)

UNITED STATES PATENT OFFICE
CERTIFICATE OF CORRECTION

Patent No. 3,558,543      Dated January 26, 1971

Inventor(s) Gordon Totty

It is certified that error appears in the above-identified patent and that said Letters Patent are hereby corrected as shown below:

Claim 1, Line 15, "Producing" should be --reducing--

Claim 1, Line 16, "and" should be --an--

Signed and sealed this 3rd day of August 1971.

(SEAL)
Attest:

EDWARD M. FLETCHER, JR.
Attesting Officer

WILLIAM E. SCHUYLER, JR.
Commissioner of Patents